US007587972B2

(12) United States Patent
Katz et al.

(10) Patent No.: US 7,587,972 B2
(45) Date of Patent: Sep. 15, 2009

(54) DRINK MAKING MACHINE

(75) Inventors: Jonathan M. Katz, Solon, OH (US); Stephen P. Rukavina, Bedford Heights, OH (US); Kenneth W. Bair, Akron, OH (US)

(73) Assignee: Vita-Mix Corporation, Cleveland, OH (US)

( * ) Notice: Subject to any disclaimer, the term of this patent is extended or adjusted under 35 U.S.C. 154(b) by 568 days.

(21) Appl. No.: 10/851,806

(22) Filed: May 21, 2004

(65) Prior Publication Data

US 2005/0257690 A1 Nov. 24, 2005

(51) Int. Cl.
*A23L 2/00* (2006.01)

(52) U.S. Cl. ............................. 99/275; 99/287; 99/300

(58) Field of Classification Search .................. 99/275, 99/300, 286, 287, 484; 222/132, 135, 146.6, 222/145.6, 129.3, 144.5, 158, 640; 62/137, 62/320, 354; 366/154.1, 155.1
See application file for complete search history.

(56) References Cited

U.S. PATENT DOCUMENTS 3,211,338 A * 10/1965 Weil et. al. .................. 222/643
3,592,367 A * 7/1971 Landis et al. ............... 222/244
4,276,750 A * 7/1981 Kawasumi ................... 62/137
4,392,588 A * 7/1983 Scalera .................... 222/129.4
5,323,691 A 6/1994 Reese et al. ................... 99/275
5,619,901 A * 4/1997 Reese et al. ................... 99/275
6,194,013 B1 2/2001 Kolar et al. ................. 426/231
6,230,767 B1 * 5/2001 Nelson ....................... 141/264
7,007,500 B2 * 3/2006 Lee ............................ 62/389

* cited by examiner

*Primary Examiner*—Reginald L Alexander
(74) *Attorney, Agent, or Firm*—Renner, Kenner, Greive, Bobak, Taylor & Weber

(57) ABSTRACT

A drink making machine (10) includes an ice shaving and dispensing unit (11) which provides a predetermined amount of ice, by weight, through a chute (21) to the pitcher (17) of a blending unit (12). A nozzle (30) is carried by the chute (12) and provides water through a nozzle opening (41) until a predetermined amount of water, by weight, is received by the pitcher (14). The water from the opening (41) is not allowed to directly impinge against the bottom of the pitcher (17). The water from the opening (41) is not allowed to directly impinge against the bottom of the pitcher (17) so that it does not adversely affect the weight measurements being taken.

13 Claims, 4 Drawing Sheets

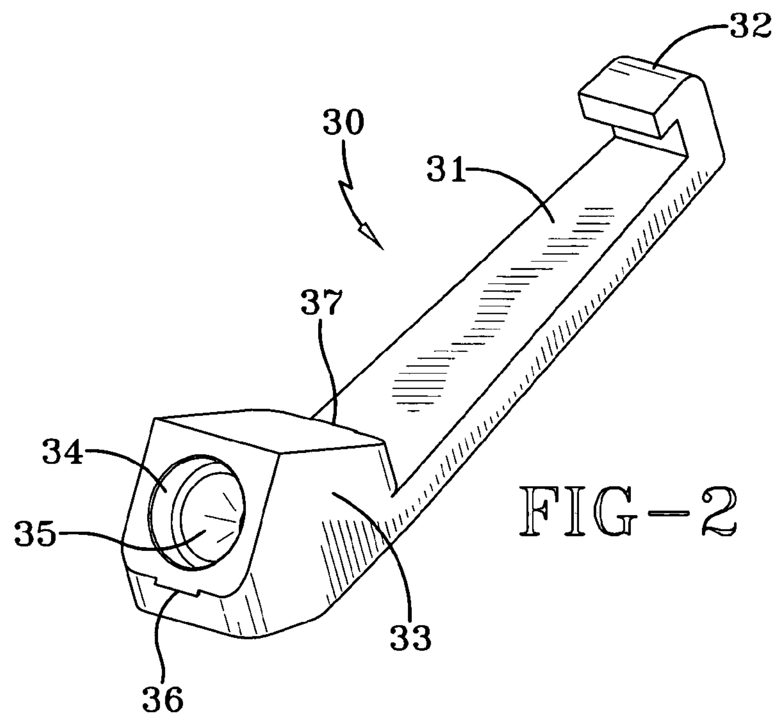
FIG-2
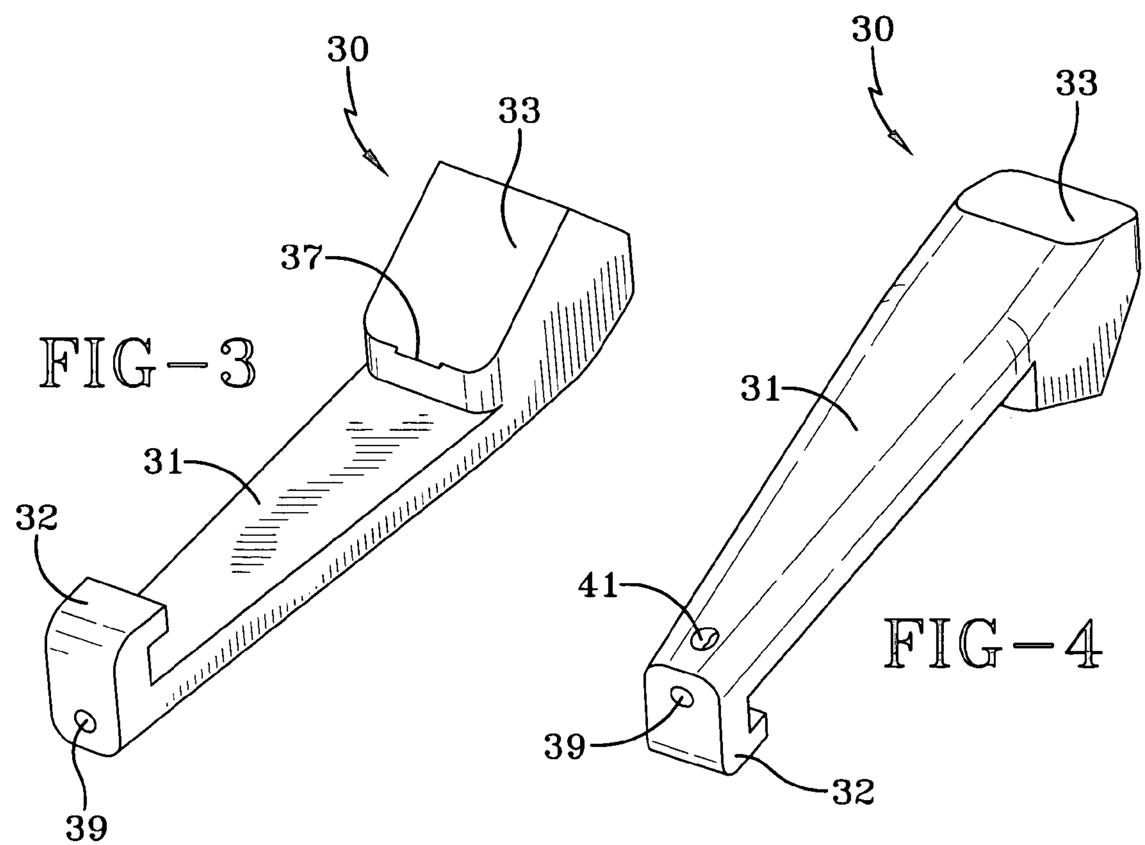
FIG-3
FIG-4

DRINK MAKING MACHINE

TECHNICAL FIELD

This invention relates to a machine which mixes drinks. More particularly, this invention relates to a machine which can deliver a precise amount of ice and liquid to the pitcher of a blender for subsequent mixing.

BACKGROUND ART

Machines which dispense a precise amount of ice into a pitcher of a blender for subsequent mixing with other ingredients such as alcohol, juices, water and the like, have become quite popular, particularly in bars and restaurants. Such machines are particularly useful in making "frozen" or slush-like drinks.

One of the very successful machines of this type is shown in U.S. Pat. No. 6,194,013. In that device, the user mixes a drink by placing an arbitrary amount of liquid or liquids in the pitcher of a blender and then operates the machine to dispense ice into the pitcher until a predetermined weight of ice is received by the pitcher. The blender is then operated to mix the drink. One of the advantages of this system is that every drink will be consistently mixed with the precise required amount of ice.

However, one problem with this type of system is that the user must be able to add the correct amount of liquids to the pitcher of the blender. Oftentimes, particularly in the environment of a crowded bar or restaurant, the user hurriedly estimates the correct amount of liquids to the detriment of consistent drinks. Since one of the more often needed liquids is water, it would be desirable to provide a machine which would dispense the correct amount of water to the pitcher. However, to date, no known machine is provided with that feature.

DISCLOSURE OF THE INVENTION

It is thus an object of the present invention to provide a machine which will dispense the desired amount of a liquid, such as water, by weight, to the pitcher of a blender for subsequent mixing.

It is another object of the present invention to provide a machine, as above, which will also dispense the desired amount of ice, by weight, to the pitcher of a blender for subsequent mixing.

It is an additional object of the present invention to provide a machine, as above, which dispenses the water to the pitcher without adversely affecting the weight measurements which are being taken.

It is a further object of the present invention to provide a machine, as above, with a nozzle which is carried by an ice chute, with the liquid being dispensed through the nozzle and the ice being dispensed through the chute.

It is yet another object of the present invention to provide a novel method of making a liquid and ice drink.

These and other objects of the present invention, as well as the advantages thereof over existing prior art forms, which will become apparent from the description to follow, are accomplished by the improvements hereinafter described and claimed.

In general, an apparatus made in accordance with the present invention is provided to make a drink of at least a liquid and ice. It includes a blending assembly including a pitcher and an ice dispensing assembly. A chute is provided to transfer ice from the ice dispensing assembly to the pitcher. A nozzle is carried by the chute and communicates with a source of liquid to provide the liquid to the pitcher.

A method of making a liquid and ice drink in accordance with the present invention utilizes a blender, a pitcher, a source of liquid and a source of ice. The method includes the steps of transferring liquid from the source of liquid to the pitcher until a predetermined weight of liquid is received by the pitcher, and transferring ice from the source of ice to the pitcher until a predetermined weight of ice is received by the pitcher.

A preferred exemplary drink making machine and its method of operation according to the concepts of the present invention is shown by way of example in the accompanying drawings without attempting to show all the various forms and modifications in which the invention might be embodied, the invention being measured by the appended claims and not by the details of the specification.

BRIEF DESCRIPTION OF THE DRAWINGS

FIG. 2 is a perspective view of a water dispensing nozzle made in accordance with the present invention and utilized in the machine of FIG. 1.

FIG. 3 is another perspective view of the water dispensing nozzle.

FIG. 4 is an additional perspective view of the water dispensing nozzle.

PREFERRED EMBODIMENT FOR CARRYING OUT THE INVENTION

Figure 1:
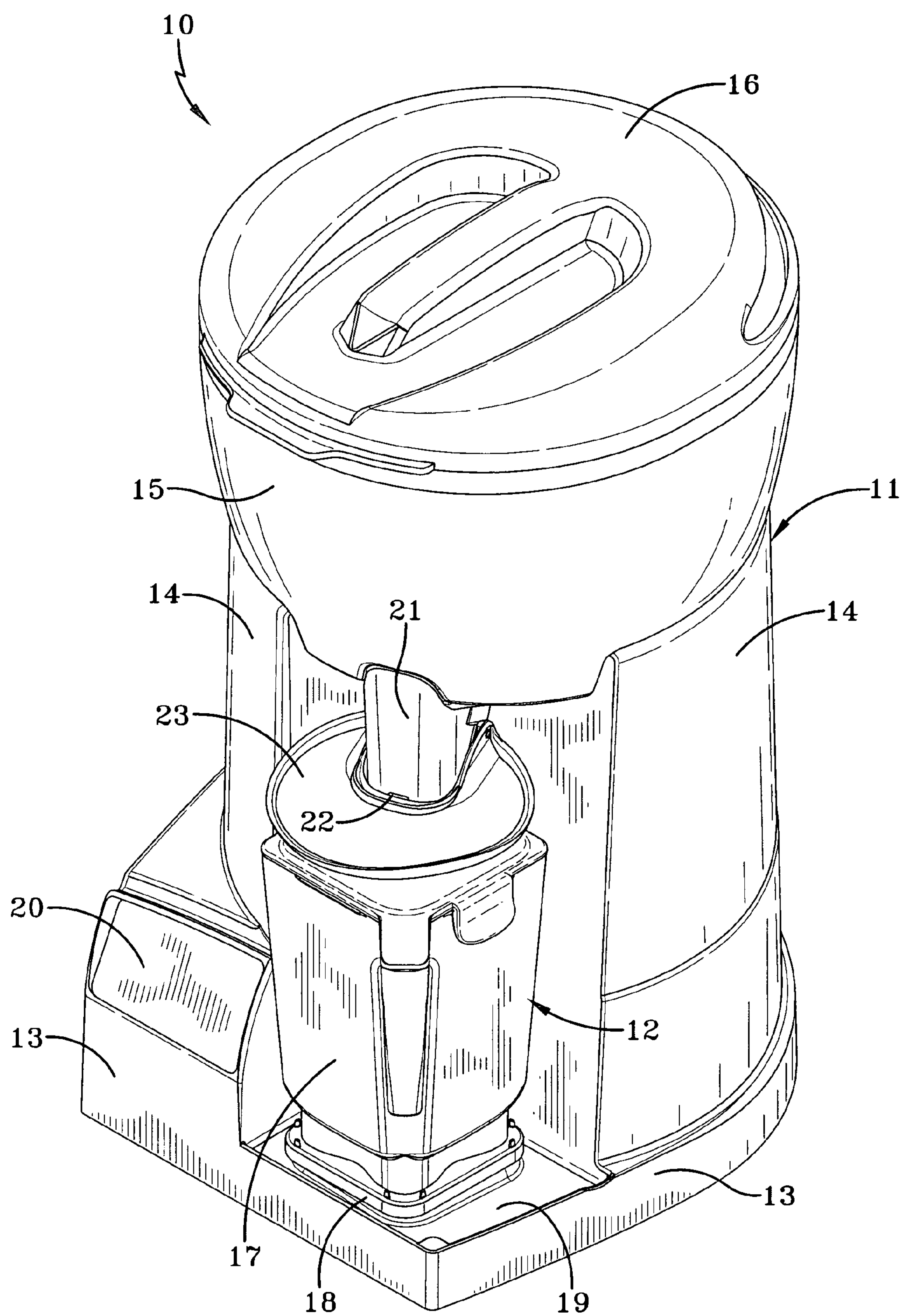
FIG. 1 is perspective view of a drink making machine which includes the features of the present invention.

A drink making machine having the features of the present invention is indicated generally by the numeral 10 in FIG. 1 and environmentally is of the type shown in U.S. Pat. No. 6,194,013 to which reference is made to more fully understand the improvements described herein. Briefly describing drink making machine 10, it basically includes an ice shaving and dispensing unit, generally indicated by the numeral 11, and a drink blending unit generally indicated by the numeral 12. A base portion 13 supports a partially cylindrical pedestal 14 which, in turn, carries an ice bin 15 which is part of ice shaving and dispensing unit 11. A cover 16 may be received on bin 15.

Blending unit 12 includes a pitcher 17 carried by a pad 18 which is positioned on a ledge 19 formed by base portion 13. Pitcher 17 is provided with a conventional mixing blade (not shown) that is rotated by a motor (not shown), the blade being connected to the motor through a drive socket formed in pad 18.

Figure 5:
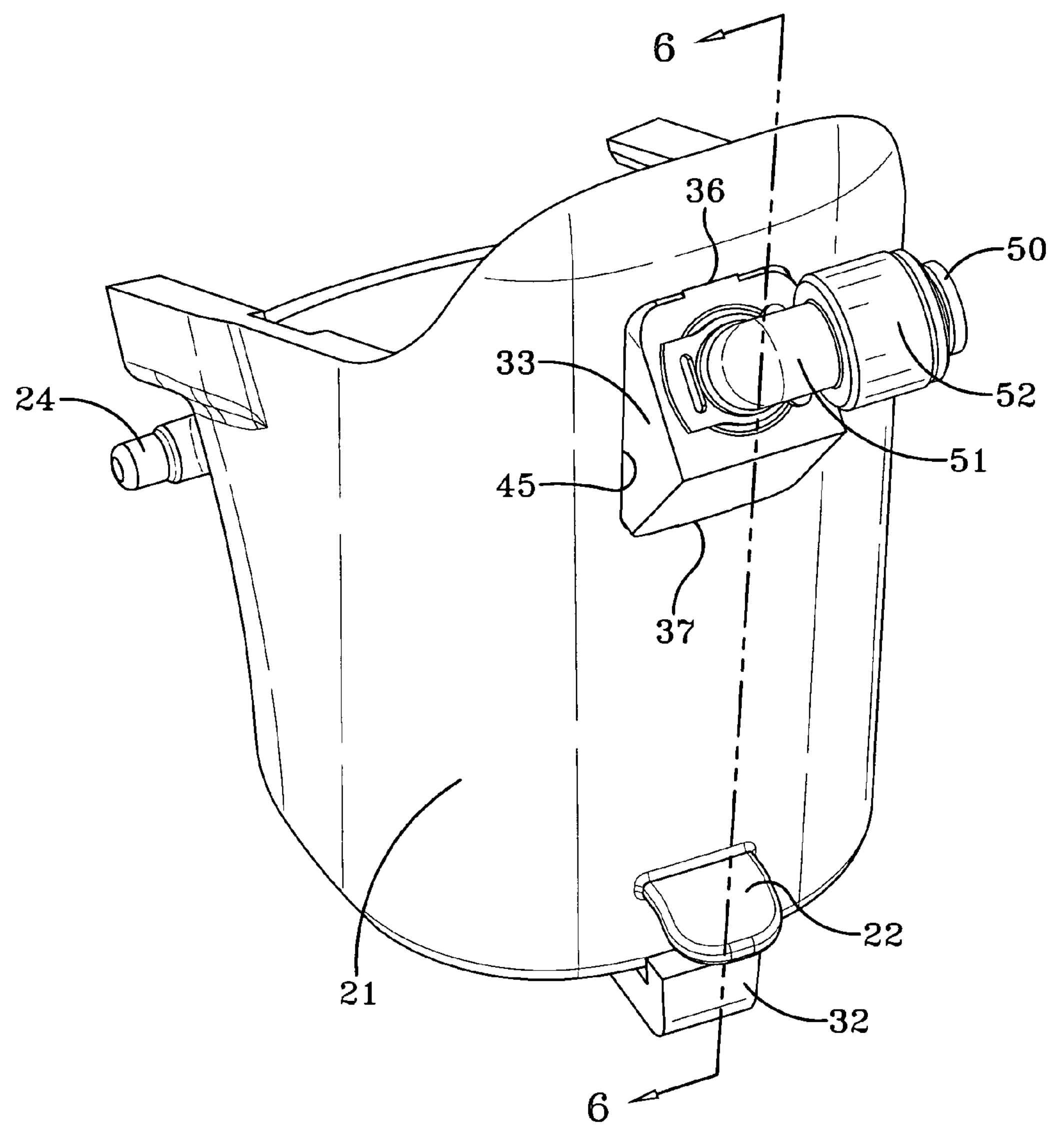
FIG. 5 is a perspective view of the ice chute of the machine of FIG. 1 having the dispensing nozzle attached thereto.

Base portion 13 also includes a control pad 20 which, as discussed in U.S. Pat. No. 6,194,013, may be provided with buttons or the like to provide the user with a variety of options of drink selections. When a particular drink option is selected, ice shaving unit 11 is activated so that a blade (not shown) positioned near the bottom of ice bin 15 will shave ice and dispense it through an ice chute 21 to pitcher 17. A weighing mechanism, positioned below ledge 19 and described in detail in U.S. Pat. No. 6,194,013, will then weigh the ice received in pitcher 17 and turn off unit 11 when a predetermined weight of ice is received in pitcher 17, that amount being determined dependent on the drink option selected on the control pad 20. As shown in FIG. 5, chute 21 can be provided with a lip 22 upon which one end of a splash guard 23 may rest. Splash guard 23 thus prevents the liquid and ice in pitcher 17 from splashing out the open top of pitcher 17. The other end of splash guard 23 may be pivotally mounted, as at 24, to chute 21 so that it can be swung out of the way to remove pitcher 17.

As previously described, in the prior art, the user would, preferably before, but sometimes after, the addition of ice to pitcher 17, pour into the pitcher 17 the liquid or liquids in an amount thought to be necessary to make the desired drink. In accordance with the present invention, the precise amount of at least one liquid can be automatically discharged into pitcher 17 through chute 21. Although any liquid could be so dispensed, as described herein, the liquid will most often be referred to as "water" since water is not only a prime drink component but also is readily available for use.

Figure 6:
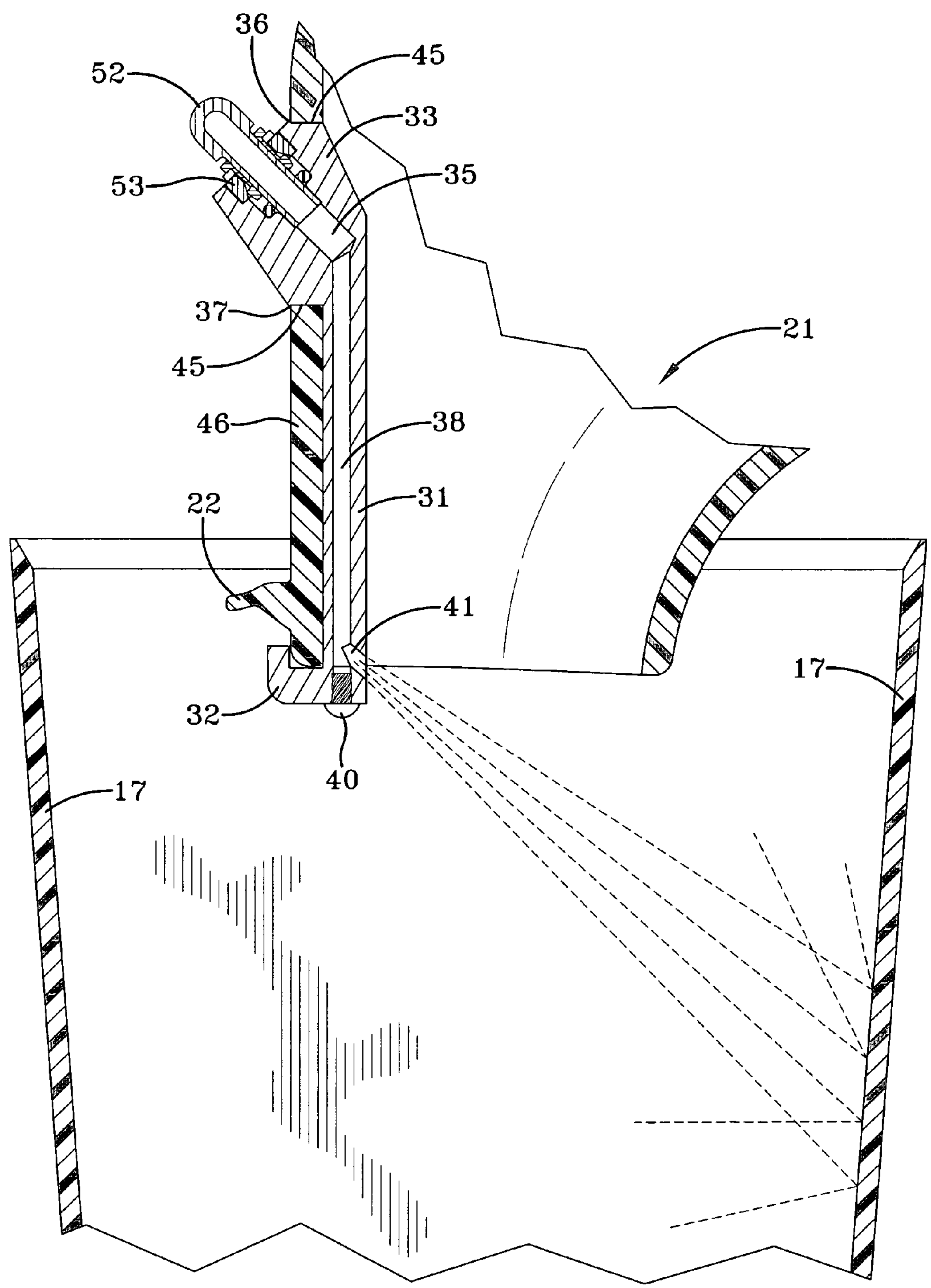
FIG. 6 is a sectional view taken substantially along line 6-6 of FIG. 5 and schematically showing a portion of a pitcher of a blender below the ice chute.

Best shown in FIGS. 2-4 is a water nozzle generally indicated by the numeral 30. Nozzle 30 can be formed of any suitable plastic material and includes an elongate bar 31 having a hook member 32 formed at one end, and a water inlet and mounting block 33 formed on its other end. Block 33 is provided with an aperture 34 and a channel 35 therethrough, channel 35 communicating at one end with aperture 34. Block 33 also includes opposed mounting tabs 36, 37 for attachment to chute 21 as will be hereinafter described. The other end of channel 35 communicates with a passageway 38 (FIG. 6) which extends longitudinally from channel 35 all the way through bar 31. For the ease of manufacture, passageway 38 is shown as being open through hook member 32, as at 39, but when installed, passageway 38 is closed by a plug 40, as shown in FIG. 6. A nozzle opening 41 extends angularly (not at a right angle) through bar 31 at the area of hook member 32 and communicates with passageway 38.

Nozzle 30 is carried by chute 21 as is best shown in FIG. 6. To that end, chute 21 is provided with an opening 45 in wall 46 thereof. Hook 32 of nozzle 30 is received around the bottom of wall 46 and mounting block 33 is snapped into opening 45 with tabs 36 and 37 engaging the edge of opening 45.

Mounting block 33 is attached to a supply of water or other liquid in a manner shown in FIGS. 5 and 6. A hose or similar conduit 50 can communicate with a supply of water. Communication with that supply can be initiated or terminated by a conventional solenoid valve (not shown) or the like associated with conduit 50. Conduit 50 is shown as being connected to one branch of an elbow 51 by a coupler 52. The other branch of elbow 51 is received in aperture 34 of block 33 of nozzle 30 and is attached therein by a conventional fitting assembly 53.

In operation of machine 10, the user selects a particular drink option by depressing the corresponding button on control pad 20. If that button is programmed to make a drink having water (or the liquid communicating with hose 50), the water will begin to flow out of nozzle opening 41 and will continue to flow until such time that a predetermined weight of water is in pitcher 17, at which time the solenoid will shut off the flow to nozzle 30. It should be noted that because nozzle opening 41 is provided angularly at the side of bar 31, the water does not directly impact the bottom surface of pitcher 17 where it might adversely affect the weight measurements being taken. Rather, as shown in FIG. 6, the water is directed to and otherwise impinges a side or a corner of pitcher 17 so that any false weight readings are minimized. Although ice could have already been supplied to pitcher 17, preferably after the correct amount of water has been transferred to pitcher 17, the ice shaver is then activated to supply the desired predetermined amount of ice, by weight, to pitcher 17.

It should thus be evident that a drink mixing machine, constructed and operated as described herein, accomplishes the objects of the present invention and otherwise substantially improves the art.

What is claimed is:

1. Apparatus for making a drink of at least a liquid and ice comprising a blending assembly including a pitcher, an ice dispensing assembly, a chute to transfer ice from said ice dispensing assembly to said pitcher, and a nozzle positioned in said chute, said nozzle having an elongate passageway with a first end and a second end, and an opening near said second end, said first end communicating with a source of liquid, said nozzle opening extending from said passageway at an angle relative to said passageway, wherein liquid may be provided through said nozzle opening directly to said pitcher.

2. The apparatus of claim 1 wherein said nozzle includes a hook to engage said chute.

3. Apparatus for making a drink of at least a liquid and ice comprising a blending assembly including a pitcher, an ice dispensing assembly, a chute to transfer ice from said ice dispensing assembly to said pitcher, said chute having an opening therein, and a nozzle carried by said chute, said nozzle communicating with a source of liquid to provide liquid to said pitcher, and having a block received in said opening.

4. The apparatus of claim 3 wherein said block includes opposed tabs to engage said opening.

5. The apparatus of claim 4 wherein said nozzle includes a hook to engage said chute.

6. Apparatus for making a drink of at least a liquid and ice comprising a blending assembly including a pitcher, an ice dispensing assembly, a chute to transfer ice from said ice dispensing assembly to said pitcher, and a nozzle positioned in said chute, said nozzle having an elongate passageway with a first end and a second end, and an opening near said second end, said first end communicating with a source of liquid, said nozzle opening extending from said passageway at an angle relative to said passageway, wherein liquid may be provided through said nozzle opening to said pitcher without directly impacting the bottom of said pitcher.

7. Apparatus for making a drink of at least a liquid and ice comprising a blending assembly including a pitcher, an ice dispensing assembly, a chute to transfer ice from said ice dispensing assembly to said pitcher, a nozzle carried by said chute, said nozzle including a liquid passageway having a first end and a second end, said passageway being adapted to communicate with a source of liquid at said first end and an opening near said second end to provide liquid to said pitcher, and a plug at said second end of said liquid passageway.

8. Apparatus for making a drink of at least a liquid and ice comprising a blending assembly including a pitcher, an ice dispensing assembly, a chute to transfer ice from said ice dispensing assembly to said pitcher, and a nozzle positioned in said chute, said nozzle having an elongate passageway with a first end and a second end, and an opening near said second end, said first end communicating with a source of liquid, said nozzle opening extending from said passageway at an angle relative to said passageway, wherein liquid may be provided through said nozzle opening directly to said pitcher, and wherein said nozzle includes an elongate bar having said passageway therethrough.

9. The apparatus of claim 8 further comprising a nozzle opening in said bar communicating with said passageway.

10. Apparatus for making a drink of at least a liquid and ice comprising a blending assembly including a pitcher, an ice dispensing assembly, a chute to transfer ice from said ice dispensing assembly to said pitcher, and a nozzle carried by said chute, said nozzle communicating with a source of liquid and including an elongate bar having a passageway therethrough and a nozzle opening in said bar, said nozzle opening being angled relative to said passageway to provide liquid to said pitcher without directly impacting the bottom of said pitcher.

11. Apparatus for making a drink of at least a liquid and ice comprising a blending assembly including a pitcher, an ice dispensing assembly, a chute to transfer ice from said ice dispensing assembly to said pitcher, and a nozzle carried by said chute, said nozzle communicating with a source of liquid and including an elongate bar having a passageway therethrough to provide liquid to said pitcher, said nozzle further including a mounting block at one end of said bar, said mounting block having an opening therein and a channel from said opening to said passageway.

12. The apparatus of claim 11 wherein said chute has an opening therein and said block includes opposed tabs to engage said opening in said chute.

13. The apparatus of claim 11 wherein said nozzle includes a hook at the other end of said bar to engage said chute.

* * * * *

UNITED STATES PATENT AND TRADEMARK OFFICE

CERTIFICATE OF CORRECTION

PATENT NO. : 7,587,972 B2
APPLICATION NO. : 10/851806
DATED : September 15, 2009
INVENTOR(S) : Katz et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 829 days.

Signed and Sealed this

Twenty-first Day of September, 2010

David J. Kappos

*Director of the United States Patent and Trademark Office*